(12) United States Patent
Michaelis et al.

(10) Patent No.: US 8,963,997 B2
(45) Date of Patent: Feb. 24, 2015

(54) LASER SCANNER DEVICE AND METHOD FOR THREE-DIMENSIONAL CONTACTLESS RECORDING OF THE SURROUNDING AREA BY MEANS OF A LASER SCANNER DEVICE

(75) Inventors: Steffen Michaelis, Braunschweig (DE); Stefan Krause, Brannschweig (DE)

(73) Assignee: Deutsches Zentrum fuer Luft-und Raumfahrt E.V., Cologne (DE)

( * ) Notice: Subject to any disclaimer, the term of this patent is extended or adjusted under 35 U.S.C. 154(b) by 885 days.

(21) Appl. No.: 13/014,852

(22) Filed: Jan. 27, 2011

(65) Prior Publication Data

US 2012/0044326 A1 Feb. 23, 2012

(30) Foreign Application Priority Data

Jan. 27, 2010 (DE) .................. 10 2010 005 993

(51) Int. Cl.
*H04N 13/02* (2006.01)
*G02B 26/10* (2006.01)
*G01S 17/93* (2006.01)
*G01S 17/42* (2006.01)
*G01S 7/481* (2006.01)
*G01S 17/89* (2006.01)

(52) U.S. Cl.
CPC ............ *G02B 26/101* (2013.01); *G01S 17/933* (2013.01); *G01S 17/89* (2013.01); *G01S 17/42* (2013.01); *G01S 7/4817* (2013.01)
USPC ........................................................ 348/46

(58) Field of Classification Search
CPC ..... G02B 7/182; G02B 26/00; G02B 26/0833
USPC ......................................... 348/46; 74/490.06
See application file for complete search history.

(56) References Cited

U.S. PATENT DOCUMENTS

| 5,090,797 A | 2/1992 | Cleveland et al. |
| 5,557,397 A | 9/1996 | Hyde et al. |

(Continued)

FOREIGN PATENT DOCUMENTS

| DE | 25 42 233 | 9/1975 |
| DE | 699 01 021 | 1/1999 |

(Continued)

OTHER PUBLICATIONS

Whalley, M., et al. Design and Flight Test Results for a Hemispherical LADAR Developed to Support Unmanned Rotocraft Urban Operations Research, American helicopter Society Int'l, Inc. (2008), 18 pgs.

(Continued)

*Primary Examiner* — William C Vaughn, Jr.
*Assistant Examiner* — Naod Belai
(74) *Attorney, Agent, or Firm* — Whitham Curtis Christofferson & Cook, PC

(57) ABSTRACT

A laser scanner device having a laser beam emission apparatus which is designed to emit at least one laser beam in an emission area, and a mirror arranged at least partially in the emission area, and having a receiving apparatus which is designed to receive reflections of the laser beam, includes a first drive device which can move a first kinematic chain, and a second drive device which can move a second kinematic chain. The is connected to the first and to the second kinematic chain and can be scanned in mutually independent coordinate directions (X, Y) via the first and the second kinematic chain.

12 Claims, 6 Drawing Sheets

(56) References Cited

U.S. PATENT DOCUMENTS

| | | | |
|---|---|---|---|
| 5,980,052 A | 11/1999 | Thor et al. | |
| 7,375,826 B1* | 5/2008 | Lavelle et al. | 356/607 |
| 2008/0221843 A1* | 9/2008 | Shenkar et al. | 703/1 |
| 2011/0006943 A1* | 1/2011 | Shaffer | 342/146 |
| 2011/0063446 A1* | 3/2011 | McMordie et al. | 348/159 |
| 2013/0057650 A1* | 3/2013 | Song et al. | 348/46 |

FOREIGN PATENT DOCUMENTS

| | | |
|---|---|---|
| EP | 1 221 582 | 7/2002 |
| EP | 1 245 982 | 10/2002 |
| WO | 01/18857 A1 | 3/2001 |

OTHER PUBLICATIONS

Wulf, O., et al., Fast #D Scanning methods for Laser Measurement Systems, Institute for Systems Engineering, Univ of Hannover, Germany (no date given), 6 pgs.

Ng, T, Development of a 3D LADAR system for Autonomous Vehicle Guidance, SIMTech Tenical Reports, (2005), vol. 6, No. 1, pp. 13-18.

\* cited by examiner

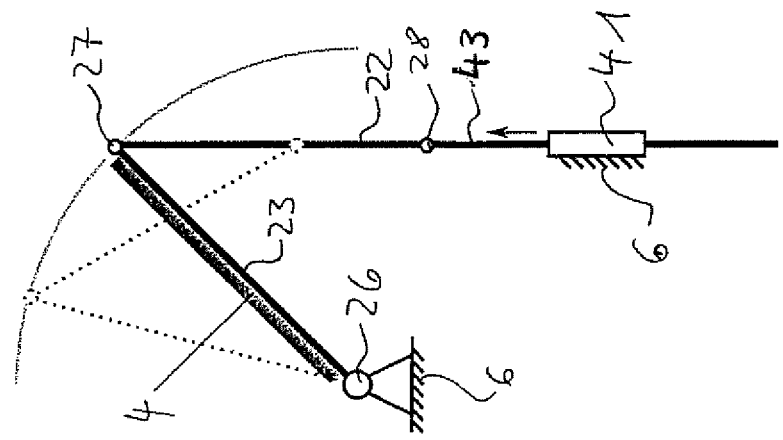
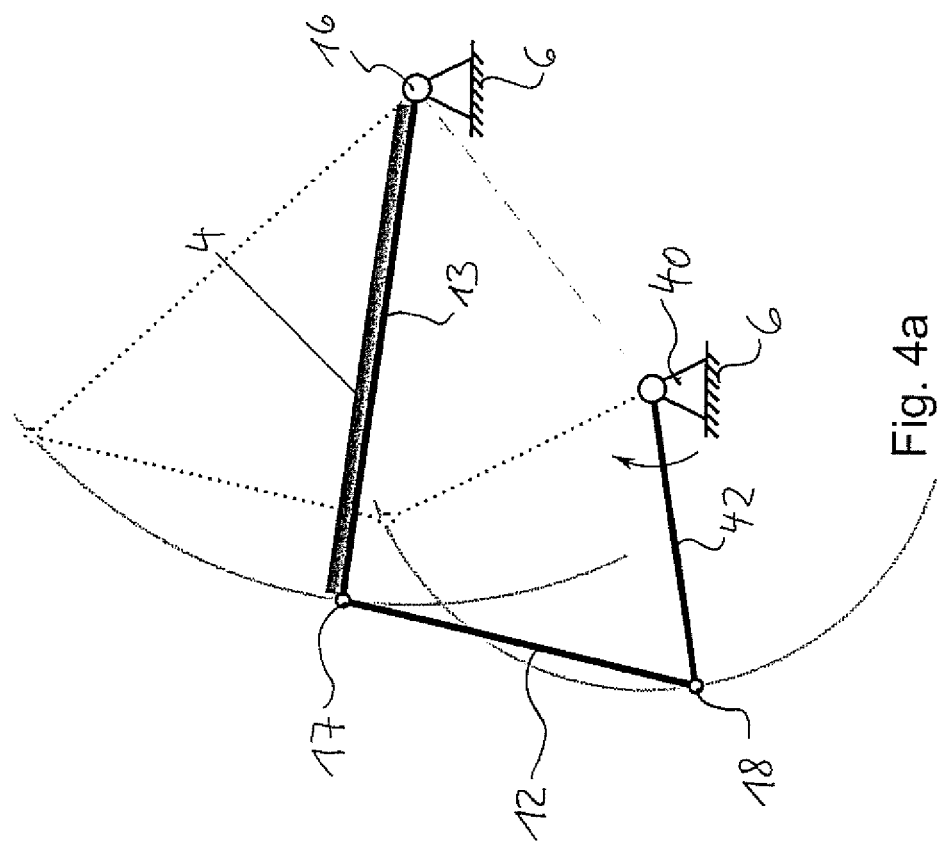

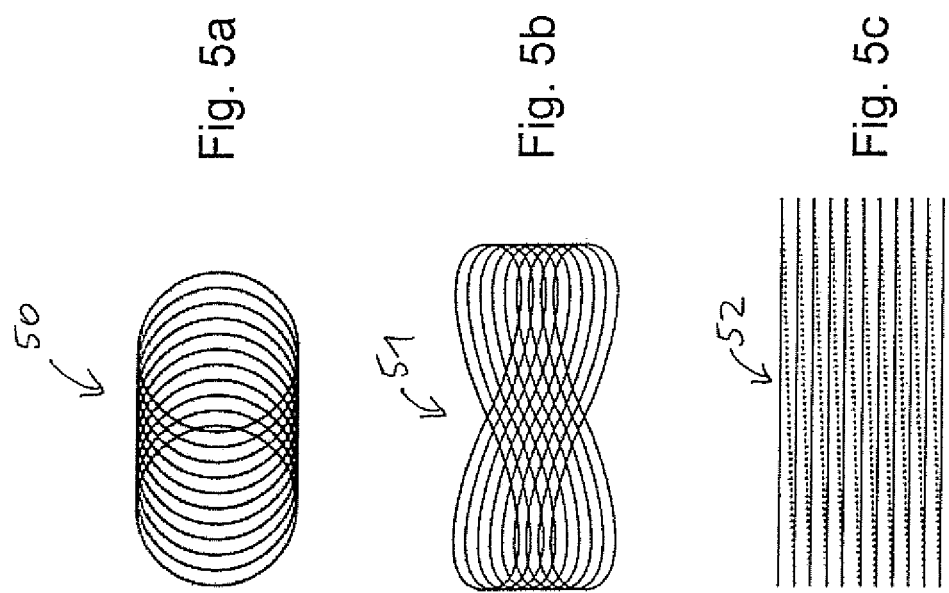

LASER SCANNER DEVICE AND METHOD FOR THREE-DIMENSIONAL CONTACTLESS RECORDING OF THE SURROUNDING AREA BY MEANS OF A LASER SCANNER DEVICE

FIELD OF THE INVENTION

The invention relates to a laser scanner device and a method for three-dimensional contactless recording of a surrounding area.

BACKGROUND

Nowadays, the field of use of modern laser scanner systems is widespread. In particular, they are used to determine distances to other objects, for obstruction identification, for object identification and for recording of a three-dimensional image of the three-dimensional surrounding area. This is particularly relevant for safety-critical applications, for example for controlling unmanned aircraft (UAV—Unmanned Aerial Vehicle), in which visually assisted perception of the surrounding world is required).

Laser scanner systems, which operate both in the 2D range and in the 3D range, are generally based on one of two techniques. In the first variant, a laser light source is used whose light is scattered in the surrounding area via mechanically moved mirrors and/or joints. For example, a two-dimensional scanning process is provided by using a mirror which is moved by a mechanical drive, or a mechanical drive which moves the laser source. Two drives are required to produce a three-dimensional scan.

In the second variant, a plurality of light sources and/or lasers are mounted on one axis, as a result of which, in principle, there is no need to scan or scatter the laser light for a two-dimensional scan. On the one hand, this has the major advantage that it increases the scanning rate, but it has the critical disadvantage that the technology is more complex, expensive and large, and this has a negative effect, in particular in the field of unmanned aircraft. In order to obtain a three-dimensional image, it is also possible to scan the laser beam emission source, which is mounted on the axis, along the perpendicular to this axis, thus leading to a so-called "fan beam".

In addition to these three-dimensional laser scanner systems which are based on more than one light source and/or laser source, it is also possible to upgrade the widely used 2D laser line scanners, which are based on only a single light source, by additional mirrors or joints, thus allowing three-dimensional scan images to be produced. In this case, the use of 2D laser line scanners to produce a 3D scan image has the critical advantage that, because of the light weight and the acceptable size as well as the relatively low costs in comparison to pure 3D laser scanners, the fields of application are widened considerably, thus allowing systems such as these also to be used, for example, for perception of the surrounding area in an unmanned aircraft (UAV). By way of example, "Whalley, N:; et al.: Design and flight test results for a hemispherical ladar developed to support unmanned rotorcraft urban operations research, Aeroflightdynamics Directorate (AMRDEC) US Army Research, Development & Engineering Command Ames Research Center, San Jose State Foundation Ames Research Center, Perot Systems Government Services Ames Research Center, Feb. 2008" describes an unmanned helicopter which could carry out a three-dimensional scan by means of a rotating 2D laser line scanner.

In principle, there are two variants to extend the two-dimensional emission area into the third dimension in order to obtain a three-dimensional scan from a 2D laser line scanner, In the first variant, as is described in "Wulf, O.; Wagner, B.: Fast 3d scanning methods for laser measurement systems in International Conference on Control Systems and Computer Science, volume 14 Jul. 2003", the entire laser head or the laser beam emission apparatus is moved such that the laser beam is emitted in a three-dimensional scan area. By way of example, this makes it possible to suspend the laser head on the x-axis of the laser beam such that it carries out a joint movement and thus transforms the two-dimensional line scan to the third dimension (pitching scan, variant A). Another option is to continuously rotate the laser or the laser beam emission apparatus, thus resulting in a hemispherical or spherical 3D scan area (rolling scan, variant B). In the case of a so-called rolling scan, the 3D scan area is in this case dependent on the axis on which the laser head is suspended such that it can rotate.

The second variant for obtaining a 3D scan from a 2D laser line scanner is in this case to allow the emitted laser beams to be reflected on a polygonally rotating polygonal mirror, such that the 2D line scan is transformed to the third dimension, A combination such as this of a 2D laser line scanner and a rotating polygonal mirror is correspondingly described in "T.C. Ng. Development of a 3D Ladar system for autonomous vehicle guidance, Technical report SIMTech, 2005". The major advantage of the second variant is in this case that only the polygonal mirror is rotated, which makes up a fraction of the weight of the entire laser scanner, thus resulting in very much reduced torques being produced, which is actually a critical factor for use in small UAVs. This is in fact the major disadvantage of the first variant, in which the complete line scanner is pitched and/or rotated, leading to corresponding forces and torques because of this movement of the scanner, Particularly in the case of small UAVs, this can lead to problematic flight behavior. A further disadvantage of the first variant and of the so-called rolling scan is in this case that no cable connection is used between the actual line scanner and the evaluation unit, which means that the required data must be transmitted via sliprings. Particularly at relatively high rotation speeds, this can lead to contact problems in the sliprings, and therefore to loss of data, which is a criterion for exclusion in the field of safety-critical applications.

A further disadvantage of the second variant, in which a 2D laser line scanner is combined with a rotating polygonal mirror, is that only a certain proportion of the emitted laser beams can be used for the 3D scan since, because of the rigid form of the polygonal mirror, a not inconsiderable proportion of the emitted laser beams are transmitted such that they do not strike the polygonal mirror. These laser beams are then no longer available to the scanner.

However, all variants have the considerable disadvantage in comparison to a stereo camera that the total scan time per 3D image or per 3D scan is relatively long. For example, a stereo camera requires about 0.04 second per recording, while a rotating 2D line scanner requires around 2.39 seconds per 3D scan. The so-called pitching scan configuration still results in 1.2 seconds, while around 0.8 seconds are still required per 3D scan for the variant with the polygonal mirror (for a chosen resolution of 1°). If the resolution is matched to a maximum of 0.25°, then the time required per scan is in this case multiplied by sixteen times. The following table once again shows the comparison in its totality.

TABLE

|  | Resolution 1° | Resolution 0.25° | Resolution 0.16° |
|---|---|---|---|
| Laser scanner -rotating- (scan area 180° × 180°) | 2.3 s | 38.33 s | — |
| Laser scanner -pitching- (scan area 180° × 90°) | 1.2 s | 19.2 s | — |
| Laser scanner -polygonal mirror- (scan area 90° × 60°) | 0.8 s | 12.8 s | — |
| Stereo camera (field of view 50° × 40°) | — | — | 0.04 s |

The measured data is based on the SICK LMS 201 laser scanner and a digital Firewire camera which operates with a framerate of 25 fps and a resolution of 320×240 pixels.

Particularly in safety-critical areas, for example in the UAV area, the required scan times of laser scanners are too long to ensure appropriate real-time operation. In this case, the scan times can approach those of a stereo camera only at the expense of angular resolution, or vice versa.

SUMMARY

The object of the present invention is to specify a simple and physically lightweight laser scanner device, as well as an improved method using a laser scanner device, by means of which three-dimensional recording of the surrounding area is possible.

This object is achieved by the invention as claimed in claims 1 and 7. The dependent claims contain advantageous refinements of the invention.

The invention proposes that a laser scanner device be designed having a first drive device, a first kinematic chain which can be moved by the first drive device, a second drive device and a second kinematic chain which can be moved by the second drive device. A mirror for deflection of the laser beam is in this case connected to the first and to the second kinematic chain, and can be deviated in mutually independent coordinate directions via the first and the second kinematic chain, A specific coverage area of the three-dimensional surrounding area can therefore be scanned with the laser beam, by appropriately controlling the angular position of the mirror, A kinematic chain is a system composed of rigid bodies (links) which are connected by joints. The term originates from the field of robotics. In the case of a series kinematic chain, the first link (foot) is firmly connected to the base or an end fitting. The component to be operated is attached to the last link. An active joint which is driven by a drive device and to which the next link is attached is located on each link. One such series kinematic system is an open kinematic chain. In the case of a parallel kinematic system, there is at least one closed kinematic chain. By way of example, this can be implemented by kinematically connecting at least one series kinematic chain to the base or the end fitting in two different ways. The device according to the invention and having two kinematic chains can advantageously be implemented as a parallel kinematic system with two drive devices for movement of the mirror. In one advantageous refinement, the active joints are located in the connection between the base or the end fitting and the first link. This makes it possible to make the entire structure light in weight, and to be particularly robust because of the plurality of connections to the base or the end fitting. A further advantage is that, because the drives are fitted solely to the laser scanner device, for example in the base plate, no drives need be moved and the drives which are installed may have high performance potentials since there is no need to be concerned about their weight in order to ensure rapid and nevertheless accurate movement of the overall mechanism.

A further advantage of the invention is that it is possible to use a laser beam emission apparatus which has a fixed laser beam. The laser beam can be deflected in two directions purely by the mirror. By way of example, this makes it possible to avoid the sliding contacts, which are susceptible to wear, for supplying electrical power to the laser beam emission apparatus in an embodiment with a moving laser. However, it is also possible to use the laser scanner device according to the invention with a laser beam emission apparatus having a moving, for example a rotating or scanable, laser beam, Further advantages of the laser scanner device according to the invention are The invention makes it possible to fit the laser beam emission apparatus in a fixed position, without needing the capability to pitch or rotate it via drives. This allows the implementation of a very small mechanism which does not require any large drives in order to be moved. This also leads to the drive having a low electrical power consumption.

The laser scanner device according to the invention can therefore be used even, for example, in small aircraft, for example relatively small UAVs. Furthermore, a greater proportion of the laser radiation produced by the laser beam emission apparatus can be used than, for example, in the case of laser scanners with a rotating mirror polyhedron, in which a not inconsiderable proportion of the laser radiation does not strike the mirror.

Only two drive devices are required for driving the mechanism according to the invention with two series kinematic chains in a parallel kinematic system, In an advantageous refinement such as this, both drive devices can be arranged fixed to the laser scanner device. In particular, there is no need for one drive device to be moved by the other drive device, for example as in the case of a robot arm. This likewise allows a particularly lightweight design of the laser scanner device according to the invention, and the use of lightweight drive devices.

Further advantages are: the use of only one mirror and the choice of components which are as light as possible advantageously makes it possible to design a small and lightweight laser scanner device. In comparison to systems having two or more mirrors, the refraction losses which occur are minimized in the laser scanner device according to the invention.

According to one advantageous development of the invention:
  a) the first kinematic chain has a first joint whose position can be varied by the first drive device, a second joint whose position cannot be varied with respect to the first drive device, and a first connecting element between the first and the second joint,
  b) the second kinematic chain has a third joint whose position can be varied by the second drive device, a fourth joint whose position cannot be varied with respect to the second drive device, and a second connecting element between the third and the fourth joint,
  c) the mirror is attached to the first and the second connecting element.

Only one overall degree of freedom (DOF) for each of the two mechanisms is needed for the basic requirement to make a three-dimensional recording of the surrounding area with one laser scanner device. The mirror therefore may be moved only about two axes, for example the horizontal and the vertical axis, Two active joints are advantageously provided for this purpose, specifically the first joint whose position can be varied by the first drive device and the third joint whose position can be varied by the second drive device. The other joints in the kinematic chains, specifically the second and the fourth joint, may advantageously be in the form of passive joints, which are not driven. This allows the laser scanner device to have a lightweight and compact design. Furthermore, a very precise adjustable mechanism which has little play and is nevertheless fast can be produced, in particular by the parallel kinematic system.

The first and/or the second drive device can in principle be chosen freely, for example as an electric-motor spindle or galvanometer drive. According to one advantageous development of the invention, the first and/or the second drive device have/has a piezo stepping motor. By way of example, piezo motors from Elliptec Resonant Actuator AG, for example the X15G type, can advantageously be used. Piezo motors such as these, which use the inverse piezo effect, produce a microstep movement. This microstep movement allows the mirror to be adjusted in fine steps. The use of such piezo stepping motors has the further advantage that this allows relatively small and lightweight motors to be used, thus further reducing the weight of the overall laser scanner device without having to increase the physical size. Both a variant with a rotational drive and a variant with a linear drive can be used as the piezo stepping motor.

In principle, the normal bearing elements, such as ball or roller bearings, universally-jointed bearings or ball-head/ball-socket bearings can be used for the first, the second, the third and/or the fourth joint. According to one advantageous development of the invention, the first, the second, the third and/or the fourth joint are/is in the form of an material continuity joint, In contrast to the bearing elements mentioned above, material continuity joints are, so to speak, manufactured from one piece. By way of example, pseudo-elastic material continuity joints can advantageously be used, for example composed of shape-memory alloys. in comparison to conventional bearing elements, material continuity joints have the advantage that they are largely free of play and have neither friction nor slip-stick effects. Since no wear occurs because of the lack of friction in joints such as these, there is also no need for lubrication, and this is once again advantageous in terms of maintenance and cleanliness. A material continuity joint is a point in a structure which has great flexibility than the other surrounding points, for example as a result of a deliberate reduction in the cross section of the material, or a thermal or chemical material treatment at this point.

The use of material continuity joints therefore leads to a further improvement in the mechanism, in terms of lack of play and low friction.

According to one advantageous development of the invention, the second and the fourth joint are connected to the mirror at a common attachment point. The mirror therefore has a three-point bearing. This allows a further improvement in the laser scanner device according to the invention, in terms of compact and lightweight design. In one advantageous development of the invention, the arrangement comprising the second and the fourth joint is designed at the attachment point to the mirror such that the arrangement allows the mirror to move only about two mutually orthogonal rotation axes. This makes it possible to prevent undesirable rotation of the mirror about other axis directions. By way of example, the arrangement comprising the second and the fourth joint may, for example, be designed in the form of a common universal joint, or as a universal joint. It is also advantageous for the second and the fourth joint to be in the form of material continuity joints with mutually orthogonal joint axes in the immediate vicinity of one another.

According to one advantageous development of the invention, the first and the third joint allow at least limited rotation or torsion about the longitudinal axis of a rod which is connected to the respective drive device.

According to one advantageous development of the invention, the laser beam emission apparatus is adjusted with respect to the mirror such that the laser beam is directed at that face of the mirror which is opposite the common attachment point and is provided with the mirrored surface. This advantageously allows the use of relatively physically small and therefore lightweight and low-cost mirrors, since the pivoting point of the mirror corresponds at least approximately to the impact point of the laser beam.

According to one advantageous development of the invention, the laser scanner device has a camera. The use of the image information produced by the camera makes it possible to improve the information obtained from the scanning by means of the laser beam, for example with respect to the frame repetition rate and the resolution. The camera and the laser seamier use an identical optical axis for this purpose. In one advantageous refinement, the camera is in the form of a stereo camera.

The invention furthermore relates to a method for three-dimensional recording of the surrounding area by means of a laser scanner device, which is physically designed to record the surrounding area three-dimensionally. In particular, this can advantageously be done by means of a laser scanner device of the type mentioned above, or of the type which will be described in the exemplary embodiments in the following text. However, the method is also suitable for use of different laser scanner devices, whose three-dimensional recording of the surrounding area can be controlled as required.

According to the proposed method, different scan patterns can be selected for the laser beam. The respectively used scan pattern is selected as a function of the recorded surrounding-area information from a previous surrounding-area recording process, an operating state of the laser scanner device, and/or an operating state of a device in which the laser scanner device is provided. The scan pattern can, for example, be selected as a function of the previous surrounding-area recording such that patterns which require greater attention are identified in the scanned area. When such patterns are identified, a change is made, for example, to a scan pattern which scans the areas of increased attention with higher resolution than the other parts of the scan area. If the device in which the laser scanner device is provided is in the form of an airborne vehicle, one advantageous development of the invention allows the scan pattern to be selected as a function of the operating situation of the airborne vehicle. For example, at a low airspeed, a predetermined scan area can be scanned with a uniformly distributed resolution, with a change being made in high-speed flight to a scan pattern which has increased resolution in a central part of the scan area, in the direction of flight. This allows the central area in the direction of flight, which is particularly important for safe flight, to be recorded particularly precisely.

According to one advantageous development of the invention, at least one scan pattern is provided which allows continuous movement of the laser beam. By way of example, scan patterns with circular or figure-of-eight movements are possible, with a certain offset being provided in the scan, in each movement cycle. The continuous movement of the laser beam avoids loads on the movement mechanism of the mirror, for example as a result of braking processes, which occur in the case of discontinuous movement elements. This allows the laser scanner device mechanism to be operated in an energy-saving and low-wear form.

According to one advantageous development of the invention, image information determined by a camera is additionally used to record the surrounding area. The scan area of the laser beam is limited to a section of the image area determined by the camera when a predetermined image pattern is identified in the image information from the camera. This allows the recording by the laser scanner to be limited to a specific suspicion area, which can be scanned with higher resolution in a sufficiently short time by the laser beam. For example, objects identified in the image information from the camera can be deliberately tracked by means of object tracking, and can be scanned deliberately and with high resolution via the laser beam.

According to one advantageous development of the invention, the scan area of the laser beam is limited to a section of the total area which can be scanned by the laser scanner when a predetermined pattern is identified in the section of the total area which can be scanned. This allows selective scanning of suspicion areas in the total area scanned by the laser scanner, even without using a camera or in environmental situations in which the camera does not produce image information which can be evaluated, for example when it is dark.

A plurality of sections can also advantageously be used, to which the scan area of the laser beam is limited, for example when a plurality of suspicion areas are identified.

DESCRIPTION OF THE DRAWING FIGURES

The invention will be explained in more detail in the following text with reference to exemplary embodiments and using drawings, in which:

FIG. 4a-4b show variants of kinematic chains, and

FIG. 5a-5c show variants of scanned patterns of the laser beam, and

The same reference symbols are used for mutually corresponding elements in the figures.

DETAILED DESCRIPTION

Figure 1:
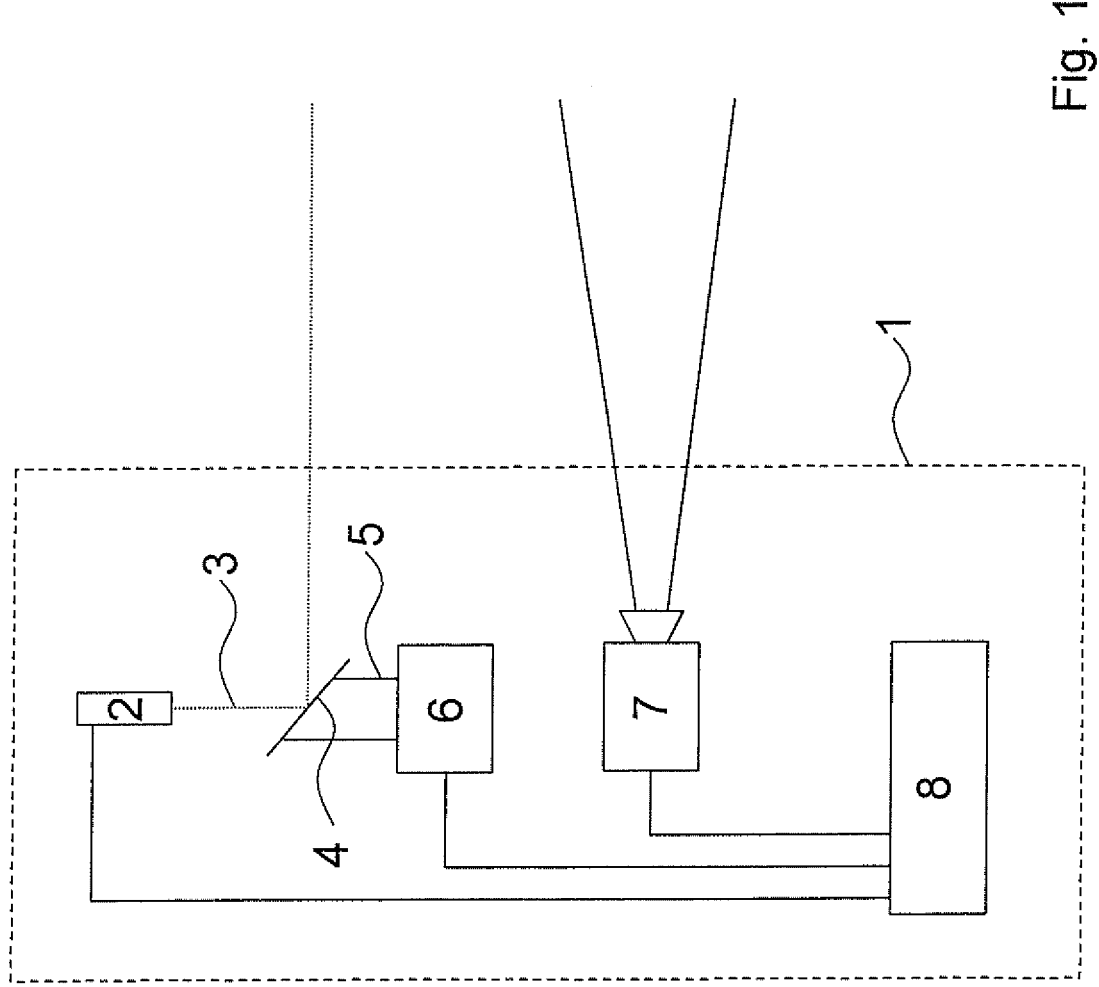
FIG. 1 shows a laser scanner device.

FIG. 1 shows a schematic illustration of a laser scanner device. The laser scanner device 1 has a laser beam emission apparatus 2 which at the same time includes a receiving apparatus for reception of reflections of a transmitted laser beam 3. The laser scanner device 1 furthermore has a mirror 4, onto which the laser beam 3 is directed and which is used to deflect the laser beam 3. The mirror 4 is mounted on a platform 6 via a mechanism 5. The laser scanner device furthermore has a camera 7. In addition, an electronic control device 8 is provided, to which the combined laser beam emission and receiving apparatus 2, the platform 6 and the camera 7 are connected. The control device 8 advantageously uses one of the methods described here to control the connected elements.

Figure 2:
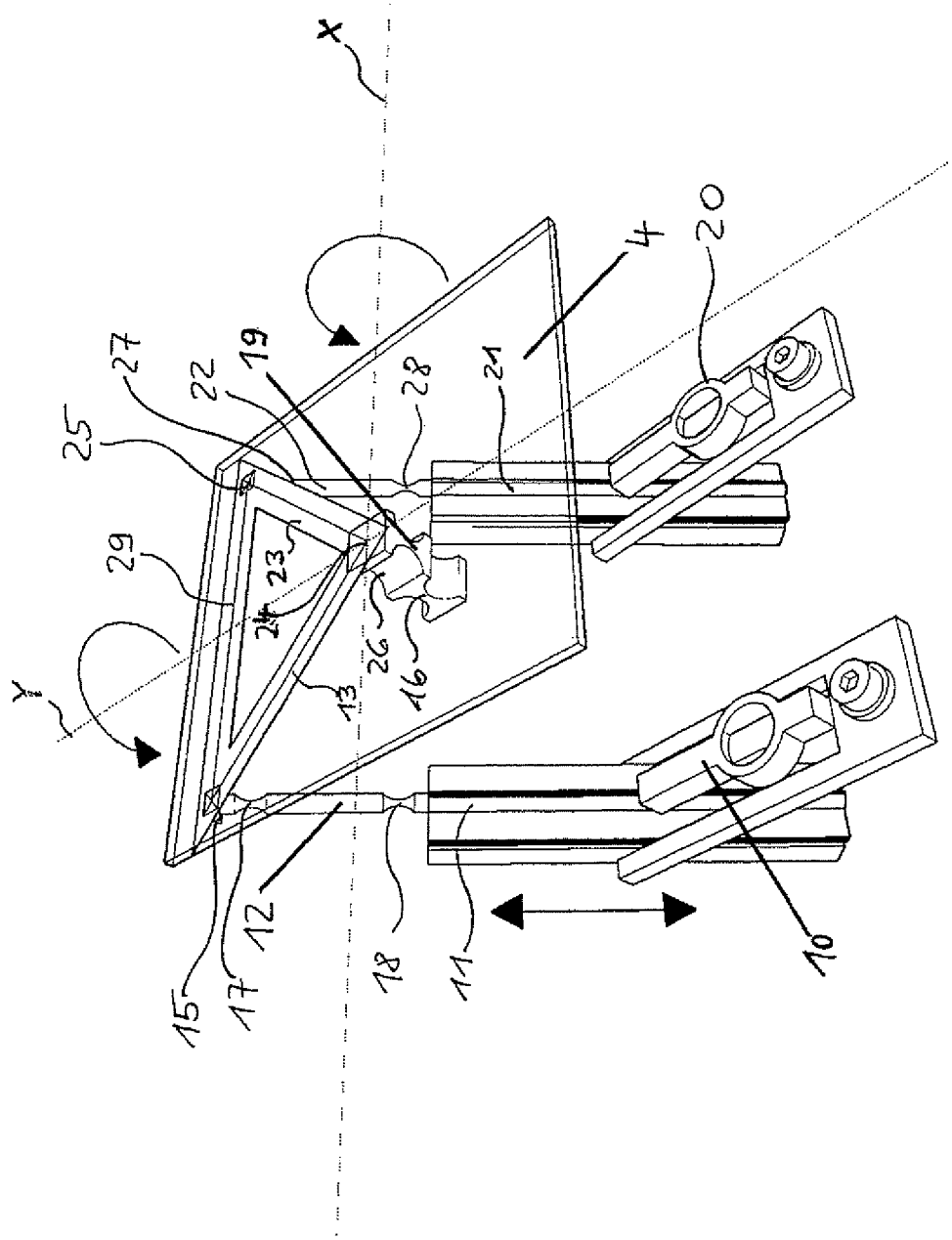
FIG. 2 shows a part of the laser scanner device as shown in FIG. 1.

FIG. 2 shows the elements of the platform 6 and of the mechanism 5 which are relevant for movement of the mirror 4. A first drive device 10 can be seen, which is in the form of a piezo stepping motor with a linear drive. The linear movement by the piezo stepping motor 10 is carried out via a drive rod 11, which is attached via a passive intermediate joint 18, a coupling rod 12 and a first passive joint 17 to an attachment point 15 by means of a triangular arrangement composed of connecting links 13, 23, 29. Analogously to this, a further piezo stepping motor is provided as the second drive device 20, and is connected via a drive rod 21, a passive intermediate joint 28, a coupling rod 22 and a third passive joint 27 to the triangular arrangement of the connecting links 13, 23, 29 at an attachment point 25. In the embodiment illustrated in FIG. 2, the second piezo stepping motor is also in the form of a linear drive.

The mirror 4 is connected at a further attachment point 24 to a common joint arrangement 19 like a universal joint. The joint arrangement 19 has a second joint 16 and a fourth joint 26 arranged in the immediate vicinity. Via the second joint 16, the joint arrangement 19 allows the mirror 4 to be tilted about an axis X, and, via the fourth joint 26, it allows the mirror 4 to be tilted in an axis Y orthogonal to this.

In this case, a first kinematic chain is formed by the drive rod 11, the intermediate joint 18, the coupling rod 12, the first joint 17, the connecting link 13 and the second joint 16. A second kinematic chain is formed by the drive rod 21, the intermediate joint 28, the coupling rod 22, the third joint 27, the connecting link 23 and the fourth joint 26. The further connecting link 29 is used to make the triangular arrangement of the connecting links 13, 23, 29 mechanically robust.

The first joint 17 can be rotated and/or twisted at least within a certain range in the longitudinal direction of the coupling rod 12. The third joint 27 can correspondingly be rotated and/or twisted at least in a certain range in the longitudinal direction of the coupling rod 22.

Figure 3:
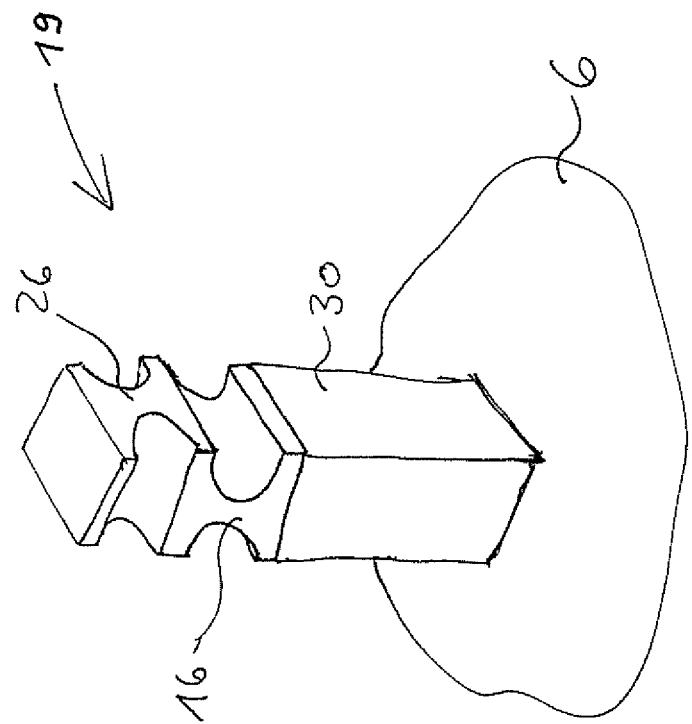
FIG. 3 shows a joint arrangement.

FIG. 3 shows an enlarged illustration of the joint arrangement 19. This shows that the joints 16, 26 are arranged in an orthogonal joint direction with respect to one another. This prevents undesirable rotation of the mirror 4, which is mounted thereon, about the vertical axis. The joint arrangement 19 is connected to the platform 6 via a connecting element 30.

FIG. 4a and 4b show two further embodiments of the drive devices connected to the respective kinematic chain. As shown in FIG. 4a, a rotational drive 40 is provided by way of example as a drive device, and is connected to the platform 6. The drive device 40 acts on the intermediate joint 18 via a connecting rod 42 and, via this, acts via the coupling rod 12 on the first joint 17, thus allowing movement of the mirror 4. Dashed lines illustrate how a further movement position of the mirror 4 appears. As can be seen, the mirror 4 is attached to the first connecting link 13, which is attached on one side to the first joint 17 and on the other side to the second joint 16. The second joint 16 is connected to the platform 6.

By way of example, FIG. 4b shows a linear drive 41 as a drive device. The linear drive 41 is likewise attached to the platform 6. The linear drive 41 is connected via a connecting rod 43 to the intermediate joint 48 and, via this, via the coupling rod 22 to the third joint 27. The position of the mirror 4 can be varied by appropriate operation of the linear drive 41. Dashed lines illustrate how a further movement position of the mirror 4 appears. As can be seen, the mirror 4 is attached to the second connecting link 23, which is attached on one side to the third joint 27 and on the other side to the fourth joint 26. The fourth joint 26 is connected to the platform 6.

FIG. 5a-5c show various laser beams scan patterns. FIG. 5a shows a scan pattern 50 formed from circular scan paths, in which the individual circles run with a certain offset with respect to one another. This allows a continuous movement of the mechanism for deflection of the laser beam 3. In this case, the circular scan paths overlap in the central scan area, advantageously allowing higher resolution of the image information obtained by the scan. FIG. 5b shows a scan pattern 51 with figure eight scan paths of the laser beam 3, in which the figure eight scan paths run with a certain offset with respect to one another. This also allows a continuous movement of the mechanism for deflection of the laser beam 3. Because of the multiple overlapping of the figure eight scan paths in the central part of the scan area, the scan pattern 51 allows increased resolution of the image information obtained by the scan. FIG. 5c shows a scan pattern 52 in which the scanning takes place along offset lines which run parallel. In this case, the laser beam 3 cannot be moved continuously; a discontinuous direction change is carried out.

The respectively used scan pattern is automatically selected as required, for example by the control device 8 or by a further control device connected to it. The control device 8 then controls the drive devices 10, 20, 41, 42 and the laser beam emission apparatus 2 such that the desired scan pattern is produced. By way of example, the control device 8 is equipped with a microprocessor, which executes an appropriate control program, for this control process.

Figure 6B:
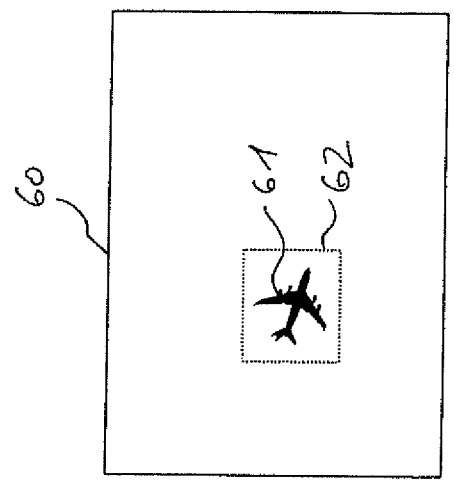
FIG. 6a-6b show recorded surrounding-area information.
Figure 6A:
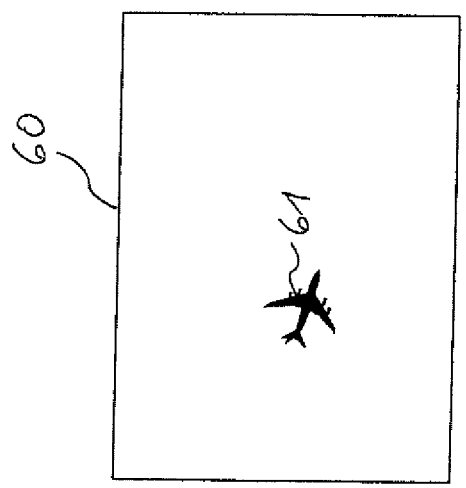

FIG. 6a shows an area 60 which can be recorded by the laser scanner device 1 by scanning by means of the laser beam 3, A comparable area is advantageously recorded by the camera 7. A predetermined pattern 61, for example an aircraft flying past, is identified in the recorded area 60, by image processing. As can be seen in particular in FIG. 6b, after the predetermined pattern 61 has been identified, the scan area of the laser beam 3 is limited to a section 62 of the total area 60 which can be scanned by the laser scanner 1.

In contrast to a camera, a laser scanner requires a comparatively long time to record the surrounding area with comparable resolution. When sensor fusion is carried out on the basis of image information from a camera and a laser scanner for a "sense and avoid" application, there is frequently no need for the laser to continuously scan the entire field of view, if monitoring is carried out by the cooperating sensor, that is to say the camera. By way of example, supposed objects which are detected during the monitoring by the camera can be scanned deliberately by the laser scanner, in the process being measured more accurately, with a possible collision partner being identified on the basis of a three-dimensional database such as this. As can also be seen in FIG. 6a and 6b, there is no point in scanning the entire area 60 there since there is a high probability that large parts of the area 60 will not contain any significant information. The section around the object 61 to be avoided is of considerable interest, as a result of which the information base is improved significantly by using the laser beam to scan this section more precisely.

In order to allow such variable scan patterns as shown in FIG. 5a-5c or restricted scan areas as shown in FIG. 6b, it must be possible to position the laser beam freely in the desired scan area or in the field of view of the camera, and the laser scanner device according to the invention makes this possible.

The combination of two drive devices 10, 20, 41, 42 which act on a central mirror 4 and provide the capability to adjust the mirror 4 independently within specific movement limits, for example in the range ±60° in the X direction and ±15° in the Y direction, makes it possible to provide freely programmable scan patterns, thus improving the capabilities for improvement of recording of the surrounding area and collision avoidance.

One possible operating mode of the laser scanner device is a continuous scan of the entire field of view (120°×30°), for example as can be done as shown in FIG. 5c. By way of example, this mode is worthwhile when no additional camera is available for recording the surrounding area, or the operation of such an assisting sensor is adversely affected. Because of the capability to position the laser beam freely, it is additionally possible to move the laser beam to any desired positions in the area 60, for example on the basis of other sensor data, in order to carry out three-dimensional recording of the surrounding area there. In this case, relatively small scan patterns or sections of the scan area can be scanned repeatedly more frequently and with high resolution, in order to continuously track an object, without having to continuously search the entire scan area again. This makes it possible to increase the scanning rate and the angular resolution during scanning by means of the laser beam.

The invention can advantageously be used in the field of aviation and space flight, for example in the field of detection of the surrounding world, obstruction identification or collision avoidance. A further field of use is surveying and modelling of the surrounding world. Options for use also exist in the field of automobile technology and in the traffic sector, for example for detection of the surrounding world, obstruction identification or collision avoidance. Finally, advantageous applications of the invention are possible in surveillance and safety technology.

The invention claimed is:

1. A laser scanner device, comprising:
a laser beam emission apparatus which emits at least one laser beam in an emission area having a mirror arranged at least partially in the emission area;
a receiving apparatus which receives reflections of the at least one laser beam;
a first drive device;
a first kinematic chain movable by the first drive device;
a second drive device; and
a second kinematic chain movable by the second drive device,
wherein the mirror is connected to both the first kinematic chain and the second kinematic chain,
wherein the mirror can be deviated in mutually independent coordinate directions (X, Y) via the first kinematic chain and the second kinematic chain,
wherein the first kinematic chain has
a first joint whose position can be varied by the first drive device,
a second joint whose position cannot be varied with respect to the first drive device, and
a first connecting element between the first and the second joint,
wherein the second kinematic chain has
a third joint whose position can be varied by the second drive device,
a fourth joint whose position cannot be varied with respect to the second drive device, and
a second connecting element between the third and the fourth joint, and
wherein the mirror is attached to the first and the second connecting element.

2. The laser scanner device as claimed in claim 1, wherein at least one of the first drive device and the second drive device has a piezo stepping motor.

3. The laser scanner device as claimed in claim 1, wherein at least one of the first joint, the second joint, the third joint, and the fourth joint are/is in the form of an material continuity joint.

4. The laser scanner device as claimed in claim 1, wherein the second joint and the fourth joint are connected to the mirror at a common attachment point.

5. The laser scanner device as claimed in claim 1, further comprising a stereo camera.

6. A method for three-dimensional recording of a surrounding area using a laser scanner device which has:
- a laser beam emission apparatus which emits at least one laser beam in an emission area having a mirror arranged at least partially in the emission area;
- a receiving apparatus which receives reflections of the at least one laser beam;
- a first drive device;
- a first kinematic chain movable by the first drive device;
- a second drive device; and
- a second kinematic chain movable by the second drive device, wherein the mirror is connected to both the first kinematic chain and the second kinematic chain, and wherein the mirror can be deviated in mutually independent coordinate directions (X, Y) via the first kinematic chain and the second kinematic chain, comprising the steps of:
- selecting at least one scan pattern from different scan patterns of the laser beam as a function of one or more of
- recorded surrounding-area information from a previous surrounding-area recording process,
- an operating state of the laser scanner device, and
- an operating state of a device in which the laser scanner device is provided; and
- using the at least one scan pattern selected in said selecting step for a three dimensional recording.

7. The method as claimed in claim 6, wherein the at least one scan pattern is selected as a function of the device in which the laser scanner device is provided, wherein the device is an airborne vehicle.

8. The method as claimed in claim 6, wherein the at least one scan pattern allows continuous movement of the laser beam.

9. The method as claimed in at least one of claims 6, wherein image information determined by a stereo camera is used for recording the surrounding area, and wherein the scanning area of the laser beam is limited to a section of the image area which is determined by the stereo camera, when a predetermined image pattern is identified in the image information of the stereo camera.

10. The method as claimed in claim 6, wherein the scanning area of the laser beam is limited to a section of the total area which can be scanned by the laser scanner when a predetermined pattern is identified in the section of the total area which can be scanned.

11. The laser scanner device of claim 1 wherein the mirror is positionable in variable position by one or more of the first drive device via the first kinematic chain and the second drive device via the second kinematic chain.

12. The laser scanner device of claim 1 wherein said receiving apparatus is included in said laser beam emission apparatus.

* * * * *